Patented June 8, 1937

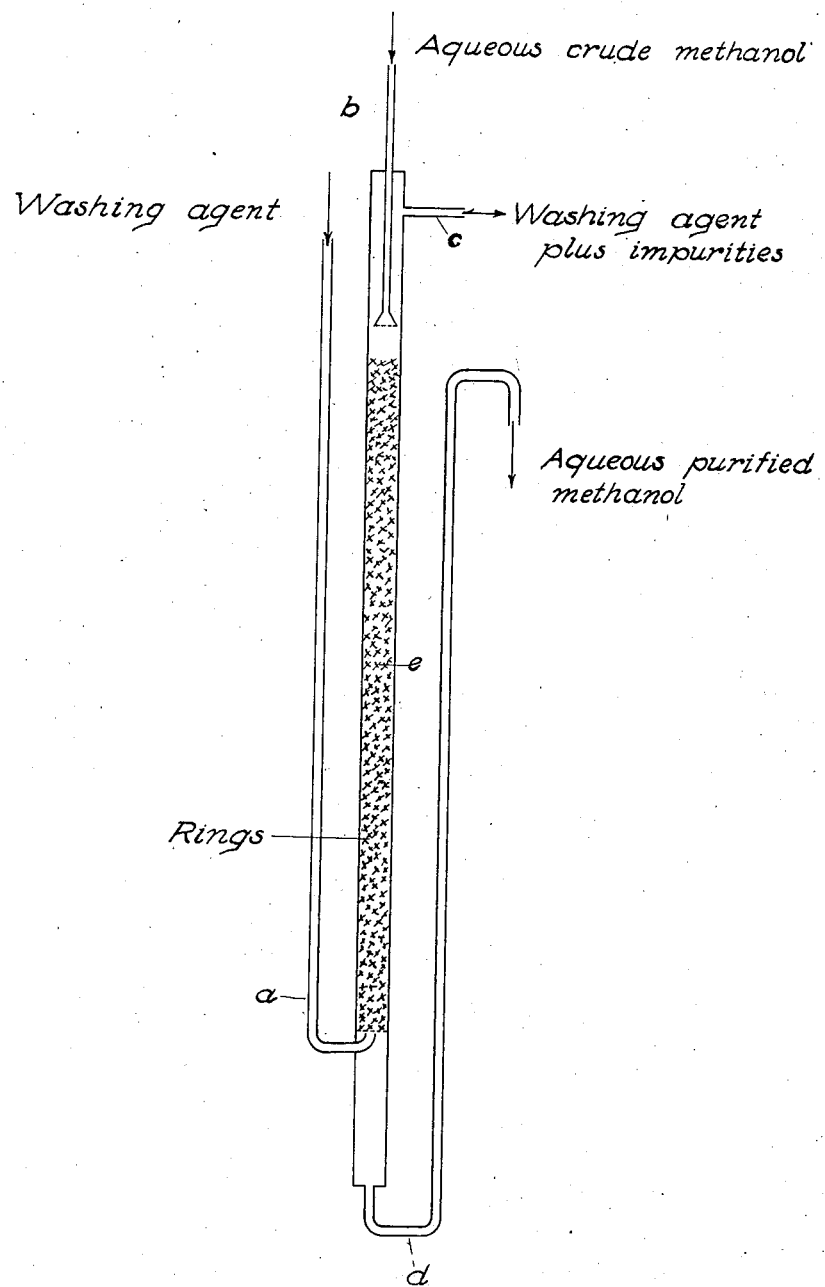

2,083,125

UNITED STATES PATENT OFFICE 2,083,125

PURIFICATION OF SYNTHETIC METHANOL

Rudolf Scheuble, Vienna, Austria, assignor to I. G. Farbenindustrie Aktiengesellschaft, Frankfort-on-the-Main, Germany Application September 11, 1934, Serial No. 743,497 In Germany March 10, 1932

5 Claims. (Cl. 260—156)

The present invention relates to the purification of synthetic methanol, more particularly to the purification of crude methanol obtained from the oxides of carbon, especially carbon monoxide, and hydrogen by catalytic synthesis at higher temperatures and under high pressures. Methanol obtained in this way always contains in addition to methanol other compounds, mainly those containing oxygen, especially higher alcohols, in particular isobutyl alcohol and higher homologues, aldehydes, such as isobutyraldehyde, and ketones, for example, isobutyrone and cyclopentanone. The separation of these usually undesirable constituents from the methanol offers considerable difficulty, because the boiling point of the undesirable substances extends over a wide range and many of these substances which are usually but slightly soluble in water form constant boiling mixtures with water or with the methanol itself. Separation by fractional distillation is only possible with difficulty, because the impurities occur in the first runnings and last runnings and also in the main fraction consisting chiefly of methanol.

The dilution of the crude synthetic methanol with a large amount of water for the purpose of precipitating the water-insoluble constituents of the crude product only leads to unsatisfactory results. Experience has shown that considerable amounts of the impurities always remain in the methanol so that numerous repetitions of the separation are necessary. This method of purification is therefore uneconomical.

I have now found that the purification of synthetically produced methanol is possible with very satisfactory results by treating the crude product or fractions of the same containing methanol in the presence of sufficient amounts of water with such organic or inorganic solvents as are scarcely miscible with water and which have a higher solvent power for the impurities than for methanol. The amount of water necessary in the purification of the crude methanol in accordance with the present process varies with the solubility of the solvent used in water: The lower the solubility of the solvent in water, the less water is added to the methanol. Generally amounts of water of between about 10 to about 30 per cent by volume should be present in the methanol to be purified. In this treatment, two layers are formed, namely an aqueous layer which contains the methanol and a second layer consisting of the added solvent and the impurities which were in the methanol. In some cases small amounts of the solvent remain in the aqueous layer; this may be recovered in known manner by fractional distillation. The second layer consisting of the solvent and the impurities still contains a certain amount of methanol. In order to recover this, it is preferable after the first treatment to wash the solvent containing the impurities with water which then absorbs the remainder of the methanol and a small amount of the impurities. This second washing water is preferably used in the purification of further amounts of crude methanol and thus returned to the process. The separation of the solvent from the impurities contained therein is effected in the usual manner by fractional distillation.

It is possible and, when working on a technical scale, preferable to carry out the said purification in counter-current and continuously.

The nature of my invention will be further described with reference to the accompanying drawing which illustrates an arrangement of apparatus suitable for carrying out the process according to this invention in counter-current, but the invention is not restricted to the particular arrangement shown.

The apparatus consists of a washing tower into which the washing agent, for example a benzine fraction, is introduced towards the bottom of the tower at $a$, while the aqueous methanol solution flows in at the top of the tower at $b$. There are then formed in the washing tower two layers, an upper layer of washing agent and a lower layer of aqueous methanol, which are both continuously withdrawn from the tower at $c$ and $d$ respectively. In order to increase the washing action, the tower is filled with rings $e$ which act as distributing bodies.

As suitable solvents may be mentioned all organic liquids which are but slightly miscible with water and inorganic liquids which behave similarly (as for example liquid sulphur dioxide), provided these liquids have a higher solvent power for the substances to be extracted than for methanol; that is to say the coefficient of distribution of the methanol between the solvent and water must be considerably less than the coefficient of distribution of the impurities to be extracted. Solvents which have a lower boiling point than methanol and also those having a higher boiling point may be employed, but the former are preferable by reason of the fact that may be more conveniently separated from the methanol. Suitable organic solvents are, for example, light benzine, methylene chloride, chlorbenzene, higher ketones, such as isobutyrone, esters, such as isoheptyl esters and carbon disulphide.

The process according to my invention allows of a convenient purification of crude synthetic methanol and constitutes a great improvement over the known processes by reason of the simplification of procedure and the saving of steam in evaporation.

The following examples will further illustrate the nature of my invention, but the invention is not restricted to these examples. The parts and percentages are by volume.

Example 1

Crude methanol obtained by catalytic synthesis from carbon monoxide and hydrogen is diluted with such an amount of water that the mixture contains 65 per cent of methanol. This mixture is extracted continuously in a counter-current column, such as is shown in the accompanying drawing, with carbon disulphide, 15 parts of carbon disulphide being used for each 100 parts of aqueous crude methanol. The methanol leaving the column at $d$ is subjected to a fractional distillation, a first runnings containing carbon disulphide being first obtained and then pure methanol free from oily constituents. The first runnings is returned direct to the column. The carbon disulphide leaving the column at $e$ is subjected to a fractional distillation in order to separate it from the impurities extracted from the crude methanol, and then returned to the column in circulation.

Example 2

Synthetic crude methanol strongly contaminated by hydrocarbons and carbonyl compounds is mixed with 10 per cent of water. The aqueous methanol solution is washed with a benzine fraction boiling from 50° to 60° C. and consisting mainly of aliphatic hydrocarbons in counter-current in a washing tower such as that shown in the drawing.

The throughput of the two liquids through the tower is so adjusted that about equal parts pass through the tower and the bromine value of the effluent methanol falls to about 4. For example in this manner a methanol having a bromine value of 560 can be washed to such an extent that it has a bromine value of only 4.

The extracted methanol is subjected to a fractional distillation in a column. In this manner there are obtained a methanol first runnings containing benzine, a main fraction being free from benzine and consisting mainly of pure methanol and having a bromine value of 1 and a less pure second runnings.

The first runnings containing benzine is separated into benzine and methanol by dilution with water. The water containing methanol thus obtained may be added in the purification of further amounts of crude methanol.

The amount of first runnings containing benzine depends on the amount of water added to the crude methanol.

Example 3

100 kilograms of strongly contaminated synthetic methanol containing 30 per cent of water are shaken with 100 kilograms of isohexyl ester. Two layers are formed. The lower layer containing methanol is again washed with an equal amount of isohexyl ester. By this washing in stages, the bromine value of the aqueous methanol is reduced from 200 to 3.

It is also possible to carry out the washing continuously in a washing tower.

Example 4

100 kilograms of strongly contaminated synthetic methanol containing 30 per cent of water are washed with 100 kilograms of isobutyrone. By repeatedly washing the methanol layer in stages, the bromine value may be reduced from 200 to 4. The purification may also be carried out continuously in a washing tower.

What I claim is:—

1. In the purification of synthetically produced methanol, the steps which comprise diluting crude methanol with water to an extent of between about 10 to about 35 per cent by volume and washing the resulting aqueous solution with a solvent which is scarcely miscible with water and with the aqueous methanol, which has a higher solvent power for the impurities than for methanol and which has a boiling point lower than that of methanol.

2. In the purification of synthetically produced methanol, the steps which comprise diluting crude methanol with water to an extent of between about 10 to about 35 per cent by volume and washing the resulting aqueous solution with a solvent which is scarcely miscible with water and with the aqueous methanol and which has a higher solvent power for the impurities than for methanol.

3. In the purification of synthetically produced methanol, the steps which comprise diluting fractions of crude methanol to an extent of between about 10 to about 35 per cent by volume and washing the resulting aqueous solutions with a solvent which is scarcely miscible with water and with the aqueous methanol and which has a higher solvent power for the impurities than for methanol.

4. In the purification of synthetically produced methanol the steps which comprise diluting crude methanol with water to an extent of between about 10 to about 35 per cent by volume and washing the resulting aqueous solution with a solvent which is scarcely miscible with water and with the aqueous methanol and which has a higher solvent power for the impurities than for methanol, separating the aqueous layer containing the methanol from the second layer comprising the added solvent and the impurities and subjecting the separated layers to fractional distillation.

5. The process as defined in claim 4, wherein the solvent layer is washed with water prior to the fractional distillation step.

RUDOLF SCHEUBLE.